United States Patent

Edwards

[11] 3,844,860
[45] Oct. 29, 1974

[54] METHOD OF MAKING AN ELECTRIC POWER CABLE

[75] Inventor: Derek Reginald Edwards, Windsor, England

[73] Assignee: British Insulated Callender's Cables Limited, London, England

[22] Filed: Mar. 29, 1972

[21] Appl. No.: 239,115

[30] Foreign Application Priority Data
Apr. 1, 1971   Great Britain........................8379
Apr. 1, 1971   Great Britain........................8380

[52] U.S. Cl................ 156/53, 156/56, 156/190, 174/25 R, 174/28, 174/110 SR, 252/64, 317/260
[51] Int. Cl. ........................................ H01b 13/00
[58] Field of Search ......... 156/47, 53, 56, 190, 143; 317/260, 258; 174/110, 25 R, 28, 110 SR; 252/64

[56] References Cited
FOREIGN PATENTS OR APPLICATIONS
1,043,328   9/1966   Great Britain........................ 156/53
1,078,023   8/1967   Great Britain........................ 156/53

*Primary Examiner*—Marion E. McCamish
*Attorney, Agent, or Firm*—Buell, Blenko & Ziesenheim

[57] ABSTRACT

Polymer/fibre laminated tapes suitable for use in the dielectric of power cables are pre-swollen with an appropriate swelling agent to avoid or reduce swelling when they contact the cable impregnant. Preferably the tapes are exposed to vapour of the swelling agent, and this technique is advantageous also for unlaminated plastic tapes; in appropriate laminates, however, there is a special advantage in that the fibrous layer may be kept free of swelling agent. In the case of paper/polypropylene laminates pre-swelling permits reduction of the interfacial pressure in the lapped tapes of the cable below 0.6 $MN/m^2$ and thereby makes it possible to make a flexible oil-filled cable insulated with this material.

7 Claims, 1 Drawing Figure

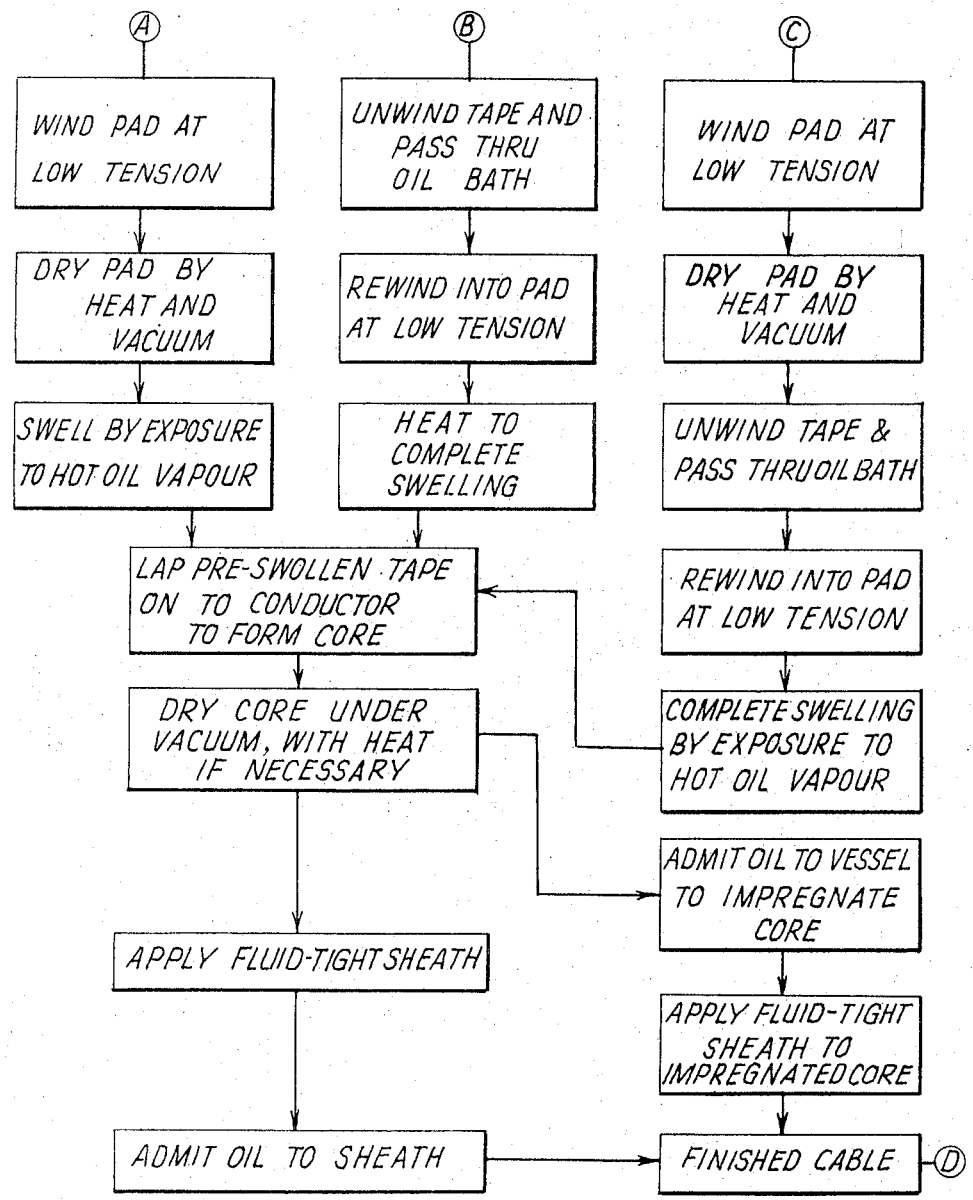

METHOD OF MAKING AN ELECTRIC POWER CABLE

This invention relates to laminates comprising at least one layer consisting of fibrous material, and at least one layer consisting mainly of a polymer and to the use of such laminates in the manufacture of electric power cables. It is especially concerned with laminates in which the polymer is derived predominantly from propylene or is a "high density" polymer derived predominantly from ethylene but other polymers with appropriate electrical properties can be used, for example polycarbonates, polysulphones, saturated linear polyesters, e.g., polyethylene terephthalate, polyphenylene oxide, poly 4-methylpentene-1, polytetrafluoroethylene, non-rubbery ethylene propylene copolymers, fluorinated ethylene propylene copolymers, polyfluorostyrene or polyvinyl carbazole.

In accordance with one aspect of the invention a laminated tape comprises at least one layer of fibrous material (the fibrous layer) and at lest one polymeric layer, the said polymeric layer containing an absorbed electrically insulating swelling agent. By a "swelling agent" is meant a liquid which upon contact and either with or without heating is absorbed by the polymeric material being used with a substantial concomitant increase in the volume of the polymeric material.

In accordance with a second aspect of the invention, a method of making an electric power cable comprises the steps of lapping onto a conductor a plurality of the tapes just described and impregnating the resultant dielectric body with an insulating liquid impregnant that swells the polymeric material in the tapes, the swelling agent present in the tapes being selected to reduce the degree of swelling that occurs upon contact with the said liquid impregnant. The invention also provides cables made by this method.

The swelling agent and the liquid impregnant will normally both be hydrocarbon oils (either mineral oils or synthetic oils such as polybutenes or dodecyl- and other alkyl-benzenes, or mixtures thereof). It is preferred that they should be identical, but the use of different but compatible liquids is not positively excluded.

The polymeric layer is preferably nonfibrous and imperforate, and is preferably sandwiched between two fibrous layers; the fibrous layer is preferably of a material that is not swollen by the swelling agents concerned; a laminate of the kind specified in British Pat. No. 1,311,867 is preferred.

In most cases the swelling agent should be introduced into the polymeric layer of the otherwise completed laminate but there may be cases in which it could be introduced into the polymeric material before the laminate is formed; this would reduce disturbance to the mechanical stress-distribution within the laminate. In some cases when an extrusion laminating technique is used to obtain a "prestressed" laminate, it may be possible to introduce the swelling agent into the polymeric material prior to extrusion, for example within the extruder barrel.

Where the swelling agent is to be introduced into a preformed polymeric foil or a preformed laminate, this may be carried out by immersing the foil or laminate in the liquid swelling agent; either it can be passed very slowly through a bath of the swelling agent, preferably at an elevated temperature, so that it emerges swollen to the required extent; or it can be passed relatively quickly through a bath and subsequently heated to allow swelling agent carried on its surface to be absorbed. If the first technique is used, excess liquid is preferably removed from the foil or laminate by wiping or by washing quickly with a volatile solvent.

Preferably however the foil or laminate is preswollen by exposing it to the vapour of the selected swelling agent until it has taken up a substantial amount of the swelling agent. This has two major and surprising advantages: firstly (despite the lower concentration of the vapour compared with the liquid and even at the same temperature) absorbtion of swelling agent is faster with the vapour than if liquid is used; and secondly the preswollen tape can be readily obtained with substantially oilfree surfaces and in the case of a laminate in which the fibrous material is not susceptible to swelling by the swelling agent used with the fibrous layers substantially dry, the latter being impossible to obtain after immersion in liquid. An additional advantage is that laminate can be preswollen by treatment with vapour in loosely wound rolls (which can be used directly as "pads" for lapping on a cable core). The use of preswelling in accordance with the present invention reduces the high interfacial pressures and high tape tensions that tend to arise during impregnation and subsequently in service (which in extreme cases can cause fracture of the tapes). In particular, the invention makes possible for the first time the manufacture of cables with a dielectric built up of oil-impregnated laminate tapes having a central layer of polypropylene and outer layers of paper in which the interfacial pressure in less than or substantially equal to 0.6 meganewton per square metre. It has been found that this is essential if the cable is to be sufficiently flexible to be wound on a drum, because if the interfacial pressure is higher the tapes will not slide over one another.

It has been found that it is desirable, when preswelling is used, to form the laminate with paper or other fibrous material of relatively low impermeability. With papers of high impermeability (e.g., in excess of 10,000 Gurley seconds in the case of a smooth cellulosic paper/polypropylene laminate preswollen in mineral oil) the pre-swelling process is rather slow and some delamination tends to occur. Low impermeability papers, however, reduce the impulse strength of the dielectric and an appropriate compromise must therefore be made.

When laminated tapes preswollen in accordance with the invention are stored, some loss of swelling agent may occur; it has been found, however, that such loss of swelling agent will be recovered very quickly when the laminate is subsequently immersed in swelling agent, for example when impregnating a completed cable.

The following examples of the manufacture of electric cables in accordance with the invention will facilitate understanding thereof. The laminates used in the examples are extrusion-bonded laminates having a central layer of polypropylene 50 micrometers thick and two surface layers of cellulosic paper each 25 micrometers thick. Laminate A was made with an uncallendered electrical grade kraft paper of a kind recommended for coil winding having a Gurley impermeability greater than 10,000 seconds. Laminate B was made with an "electrolytic" kraft paper of much lower impermeability.

Example A

Tape of each laminate as wound into pads at a very low tension and exposed at 100°C to air saturated with the vapour of a conventional cable oil (sold by Dussek Bros. Ltd. of Crayford Kent, England as "C10" oil). Samples were taken at intervals and the following measurements were obtained.

| Exposure time (hours) | Increase in | | | |
|---|---|---|---|---|
| | Thickness (%)* | | Weight (%)* | |
| | Laminate A | Laminate B | Laminate A | Laminate B |
| 1 | 0 | 5 | 1 | 5½ |
| 2 | 0 | 7½ | 1 | 6½ |
| 4 | 0 | 8½ | 1 | 8 |
| 6 | 1 | 9½ | 1½ | 9½ |
| 8 | 0 | 7 | 1 | 9 |
| 12 | 1 | 10 | 2 | 10 |
| 16 | 4 | 9 | 4½ | 11 |
| 24 | 4½ | 10 | 6½ | 12½ |

* the percentages are referred to the thickness and weight of the whole laminate, not just the polymer layer.

Some delamination of laminate A was observed by the end of this test.

In a further test using laminate B, oil vapour substantially free of air was used to effect preswelling (at a pressure of 1 mm of mercury). In this case a preswelling of about 8% of the thickness and weight of the laminate was achieved within 1 hour.

In all cases the exposed paper surfaces remained substantially free of oil.

Example B

The laminates were taken from supply rolls and run through a bath of the same oil heated to 100°C at a speed such that the immersion times was 30 seconds. After rewinding at low tension they were held in an oven at the same temperature for 4 hours.

Example C

The procedure is the same as for Example B except that instead of heating in air oil vapour under vacuum is used. This allows the heating time to be reduced to one hour.

Preswollen laminate tapes made by the method of any of the examples can be lapped onto a cable conductor to insulate it, substantially as if they were ordinary paper tapes. The insulated conductor will then be dried under vacuum (and heat, if necessary) after which it can be impregnated with oil and fluid-tight sheath applied thereto by a conventional technique; alternatively impregnation may take place after the fluid tight sheath has been applied. In either case impregnation can be carried our at ambient temperature, and a time of the order of 48 hours is required to attain stability.

Manufacture of cables in accordance with the invention as described in the foregoing examples is outlined in the accompanying drawings, in which the letters A-C indicate the starting points for the respective examples and D the completion of the manufacturing process.

What I claim as my invention is:

1. A method of making an electric power cable core comprising the steps of lapping on to a conductor a plurality of electrically insulating tapes each comprising at least one layer of fibrous material and at least one polymeric layer, said polymeric layer containing an absorbed electrically insulating swelling agent that does not swell said fibrous material and impregnating the resultant dielectric body with an insulating liquid impregnant that swells the material of said polymeric layers but not said fibrous material, said swelling agent being selected to reduce the degree of swelling that occurs upon contact with the said liquid impregnant.

2. A method as claimed in claim 1 wherein said insulating liquid impregnant is identical with said swelling agent.

3. A method of making an electrical power cable comprising the successive steps of
   i. lapping onto a conductor to form a dielectric body a plurality of tapes each comprising two paper layers and, sandwiched between and bonded to them, a layer consisting mainly of a polymer derived predominantly from propylene and containing an absorbed hydrocarbon oil that does not swell paper,
   ii. impregnating said dielectric body with a hydrocarbon insulating oil that does not swell paper, and
   iii. applying a fluid-tight sheath after step (1) is complete.

4. A method as claimed in claim 3 comprising the preliminary step of introducing said absorbed hydrocarbon oil into said polymer layer without introducing said oil into said paper layers by exposing said tapes to the vapour of said oil.

5. A method of making an electric power cable comprising the successive steps of
   i. lapping onto a conductor to form a dielectric body a plurality of electrically insulating tapes each comprising two paper layers and, sandwiched between and bonded to them, a layer consisting mainly of a high density polymer derived predominantly from ethylene and containing an absorbed hydrocarbon oil that does not swell paper,
   ii. impregnating said dielectric body with a hydrocarbon insulating oil that does not swell paper, and
   iii. applying a fluid-tight sheath after step (i) is complete.

6. A method as claimed in claim 5 comprising the preliminary step of introducing aid absorbed hydrocarbon oil into said polymer layer without introducing said oil into said paper layers by exposing said tapes to the vapour of said oil.

7. A method of making an electric cable comprising the successive steps of
   i. preparing electrically insulating laminated tapes each consisting of a layer of a plastics material sandwiched between and bonded to two layers of fibrous material,
   ii. exposing said tapes to the vapour of an insulating liquid that swells said plastics material but not said fibrous material until said plastic layer has taken up a substantial amount of said insulating liquid,
   iii. lapping said tapes onto a conductor to form a cable core,
   iv. impregnating the core with the said insulating liquid and
   v. applying a fluid-tight sheath after completion of step (iii).

* * * * *